United States Patent
Clarke

[15] 3,676,397
[45] July 11, 1972

[54] OXAZOLIDINONE-CONTAINING EPOXY RESINS AND PROCESS FOR THEIR PREPARATION

[72] Inventor: James A. Clarke, Lake Jackson, Tex.
[73] Assignee: The Dow Chemical Company, Midland, Mich.
[22] Filed: Oct. 12, 1970
[21] Appl. No.: 80,254

[52] U.S. Cl..................260/47 EP, 117/161 ZB, 161/184, 260/2 EP, 260/33.4 EP, 260/37 EP, 260/59, 260/47 EN, 260/77.5 R, 260/79, 260/307 A, 260/830 TW
[51] Int. Cl..........................................C08g 30/04
[58] Field of Search............260/47 EP, 59, 77.5 AM, 307 A

[56] References Cited

UNITED STATES PATENTS 2,947,726  8/1960  Belanger..................260/47
3,194,810  7/1965  Formaini et al..................260/307

*Primary Examiner*—William H. Short
*Assistant Examiner*—T. Pertilla
*Attorney*—Griswold & Burdick, Raymond B. Ledlie and James G. Carter

[57] ABSTRACT

Novel oxazolidinone-modified epoxy resins are prepared by reacting a polyglycidyl ether of a polyhydric compound such as the diglycidyl ether of bisphenol A with cyanuric acid or thiocyanuric acid at a temperature in the range of 130° to 180° C. The oxazolidinone-modified epoxy resins prepared in this manner have a different structure and exhibit greater Izod impact strengths as compared to the oxazolidinone-modified epoxy resins prepared from polyisocyanates and polyglycidyl ethers.

18 Claims, No Drawings

OXAZOLIDINONE-CONTAINING EPOXY RESINS AND PROCESS FOR THEIR PREPARATION

This invention relates to novel oxazolidinone-containing epoxy resins, cured products thereof, and a process for their preparation.

Oxazolidinone-containing epoxide resins are known in the art, e.g. U.S. Pat. Nos. 3,334,110; 3,413,377; 3,415,901 and 3,458,527. These patents teach the preparation of oxazolidinone-modified epoxy resins by reacting a polyisocyanate with a polyepoxide in the presence of a selected catalyst. Although the products prepared therein exhibit good heat distortion temperatures, they exhibit low Izod impact strengths which limit their use in certain applications such as coatings.

It has now been discovered that certain oxazolidinone-containing epoxy resins can be prepared which exhibit Izod impact strengths of sufficient value to render the resins suitable for coating applications.

The oxazolidinone-modified epoxy resins of the present invention are prepared by reacting a diepoxide with cyanuric acid and may be represented by the following general formula

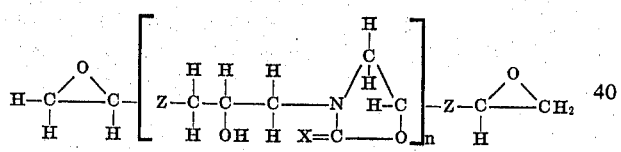

wherein Z is the divalent organic residue of the diepoxide, X is oxygen or sulfur and $n$ has a value from 1–10 and preferably 1–3.

For purposes of clarification, the following formula represents the oxazolidinone-modified epoxy resin obtained when the diglycidyl ether of isopropylidine diphenol (bisphenol A) is reacted with cyanuric acid. The dotted line brackets indicate the portion of the product represented by Z in the preceding formula.

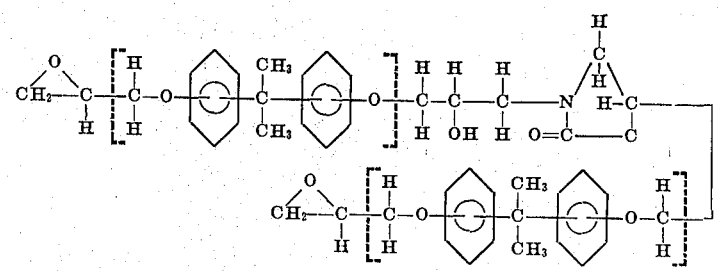

It should be noted that the products of the present invention are mixtures of analogs of the products illustrated as well as some unreacted diepoxide; however, the above formula represents that of the most prevalent product.

Polyepoxides which are employed to prepare the oxazolidinone-modified epoxy resins of the present invention include the polyglycidyl ethers of polyhydric compounds such as, for example, polyhydric phenols, bisphenols, novolac resins, polyoxyalkylene glycols, polyhydric aliphatic compounds such as glycerine, neopentyl glycol, mixtures thereof and the like. Suitable such polyglycidyl ether compounds may be represented by the following general formulas:

A

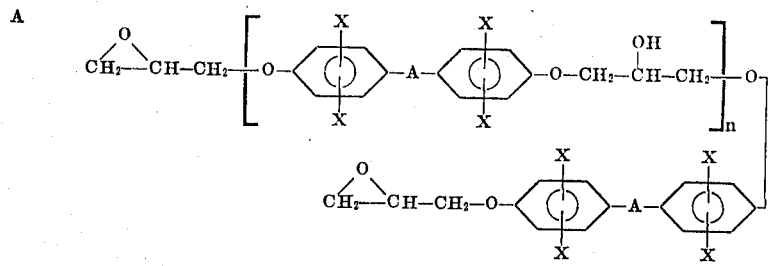

wherein A is selected from the group consisting of an alkylene or alkylidine group having from 1 to 4 carbon atoms,

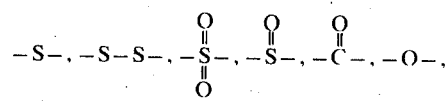

X is hydrogen or a halogen and n is an integer having an average value of from about 0 to about 10;

B

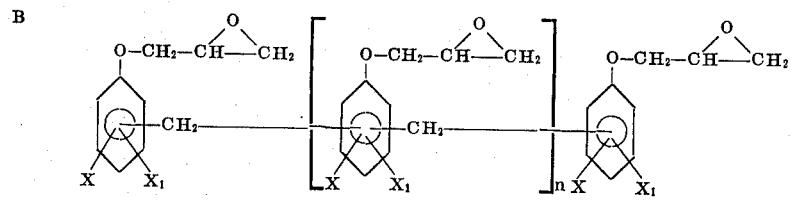

wherein X and $X_1$ are independently selected from the group consisting of hydrogen, an alkyl group having from about one to about four carbon atoms, and a halogen and $n$ is an integer having an average value of from about 0.1 to about 4;

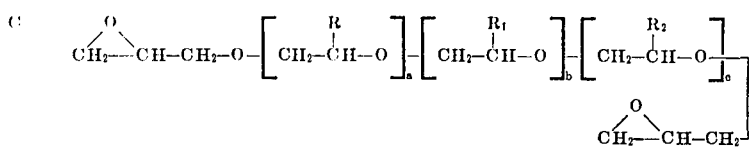

wherein R, $R_1$ and $R_2$ are independently hydrogen or an alkyl group having from about one to about four carbon atoms, and $a$, $b$, and $c$ are integers, the sum of which is an integer having an average value of from about 3 to about 40;

D
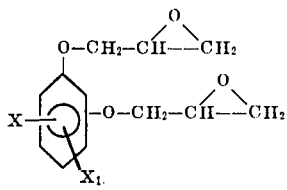

wherein X and $X_1$ are as indicated in formula B above.

E
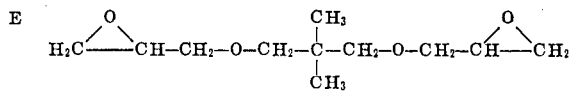

F
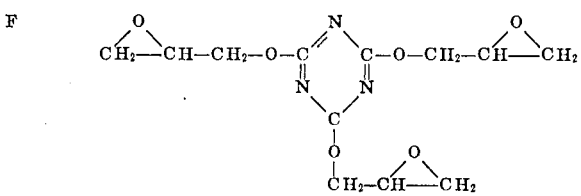

G
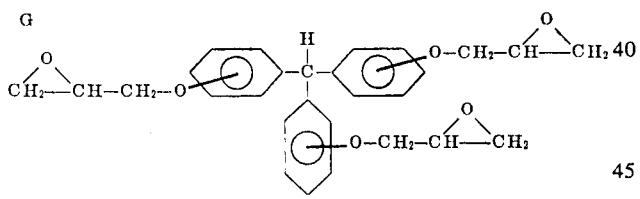

H
The glycidyl ethers of hydrogenated bisphenols represented by the general formula

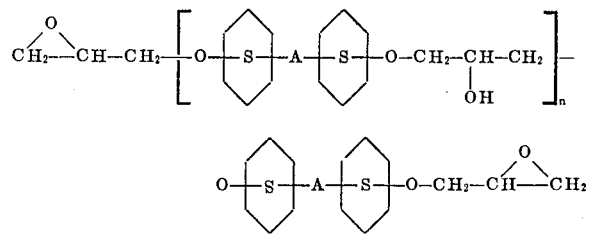

wherein A is as defined in formula A above.

Although the term cyanuric acid and thiocyanuric is employed throughout this application as being that which is reacted with the polyglycidyl ether to prepare the oxazolidinone-modified epoxy resins of the present invention, the term also includes the iso-derivatives thereof since cyanuric acid and thiocyanuric acid exist in equilibrium with their iso-forms.

In the present invention for preparing the oxazolidinone-modified epoxy resins, the polyglycidyl ether is reacted with the cyanuric acid or the thiocyanuric acid or mixtures thereof in a molar ratio of the polyglycidyl ether to cyanuric acid or thiocyanuric acid of from about 3.1:1 to about 9:1 and preferably from about 4.5:1 to about 6:1. Since many of the commercially available polyglycidyl ether compounds are actually mixtures of compounds having an average epoxide content, the molecular weight of the polyglycidyl ether compound is taken as that weight of the compound which will provide a number of epoxide

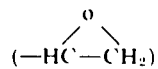

equivalents equal to the average functionality of the bulk resin, i.e. for a polyglycidyl ether having an average functionality of 2, the molecular weight is calculated as the epoxide equivalent weight (EEW) times 2

At molar ratios of polyglycidyl ether to cyanuric acid or thiocyanuric acid below 3:1, the opportunity exists for complete reaction of the epoxide content of the system. The resulting composition is either a high polymer or more likely a cured or crosslinked resin which is no longer fusible, moldable, or workable in any conventional manner. The purpose in this invention is to prepare epoxy resins that are still fusible and curable with typical hardeners for epoxy resins. With the diglycidyl ether of bisphenol A, mol ratios below about 4.5:1 will give solid resins with softening points too high to be reacted with epoxy hardeners in a conventional manner.

At molar ratios above about 9:1 the quantity of oxazolidinone groups that are formed is too small to impart sufficient improvements in the desired properties attributed to this group.

The polyglycidyl ether and the cyanuric acid or thiocyanuric acid are reacted together at temperatures in the range of from about 130° to about 180° C. and preferably from about 150° to about 170° C. Below about 130° C. the rate of the desired reaction is too slow to form the oxazolidinone product using the low levels of catalyst desired to minimize side reactions involving the epoxide group. Above about 180° C. homopolymerization of epoxide becomes a competing reaction that diminishes the improved properties of the desired product.

The reaction may be conducted at pressures of from about 30 inches vacuum to about atmospheric and above. At pressures above atmospheric there is no advantage obtained. Air should be excluded by the use of either vacuum or a nitrogen (inert gas) purge.

The reaction time is dependent upon the temperature, but the reaction is usually complete at temperatures of about 160° C. in about 3 hours with aromatic based polyepoxides and in about 7 hours with aliphatic based polyepoxides.

The reaction is preferably conducted in the absence of an inert solvent, but may be conducted in the presence of such organic solvents as dimethylformamide, nitrobenzene, orthodichlorobenzene, dioxane and the like.

Catalysts which are employed in the process of the present invention include alkali metal halides, alkali metal alkoxides, tertiary amines, quaternary ammonium compounds and phosphonium compounds.

Suitable tertiary amines include, for example, pyridine, benzyl dimethylamine, tris-(dimethylaminomethyl) phenol, triethylenediamine, N-methyl morpholine and the like.

Suitable alkali metal halides include, for example, potassium bromide, potassium chloride, potassium iodide, sodium bromide, sodium chloride, sodium iodide, lithium bromide, lithium chloride, lithium iodide and the like.

Suitable alkali metal alkoxides include, for example, lithium n-butoxide, potassium n-butoxide, sodium n-butoxide, lithium ethoxide, lithium methoxide, lithium isopropoxide, lithium n-propoxide, potassium ethoxide, potassium methoxide, potassium n-propoxide, potassium isopropoxide, sodium methoxide, sodium ethoxide, sodium n-propoxide, sodium isopropoxide, and the like.

The quaternary ammonium compounds which may be employed in the process of the present invention may be represented by the general formula

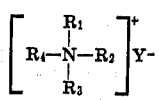

wherein $R_1$, $R_2$ and $R_3$ are independently selected from the group consisting of aliphatic hydrocarbon radicals or substituted aliphatic hydrocarbon radicals having from about one to about 25 carbon atoms, $R_4$ is selected from the same group as $R_1$, $R_2$ and $R_3$ and an aryl or substituted aryl group and wherein Y is selected from the group consisting of OH, Cl, Br, I, acetate, phosphate and the like.

Suitable quaternary ammonium compounds include: tetraethyl-ammonium bromide, tetramethyl-ammonium bromide, benzyltriethyl-ammonium bromide, tetrabutyl-ammonium bromide, phenyl triethyl-ammonium bromide, phenyltrimethyl-ammonium bromide, octadecyltrimethyl-ammonium bromide, diallyldiethyl-ammonium bromide, the corresponding iodides, chlorides, hydroxides, acetates, phosphates and the like.

The phosphonium catalysts employed in the process of the present invention may be represented by the general formula

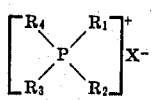

wherein $R_1$, $R_2$, and $R_3$ are independently selected from the group consisting of aliphatic hydrocarbon radicals or substituted aliphatic hydrocarbon radicals having from about one to about 25 carbon atoms, $R_4$ is selected from the same group as $R_1$, $R_2$ and $R_3$ and an aryl or substituted aryl group and wherein X is the anion portion of an inorganic or lower aliphatic carboxylic acid.

Suitable phosphonium catalysts include, for example, methyl tributyl phosphonium iodide, ethyltributyl phosphonium iodide, propyl tributyl phosphonium iodide, tetrabutyl phosphonium bromide, tetrabutyl phosphonium iodide, tetrabutyl phosphonium chloride, tetrabutyl phosphonium hydroxide, tetrabutyl phosphonium acetate acetic acid complex, tetramethyl phosphonium bromide, tetramethyl phosphonium iodide, tetramethyl phosphonium chloride, tetramethyl phosphonium hydroxide, ethyltricyclohexylphosphonium bromide, phenyltributylphosphonium iodide, methyltrioctylphosphonium dimethylphosphate, tetra(3,3-dimethylbutyl)phosphonium chloride.

Other suitable catalysts include the phosphonium salts of an acid, acid ester or ester of an element selected from the group consisting of carbon, nitrogen, phosphorus, sulfur, silicon and boron which may be represented by the general formula

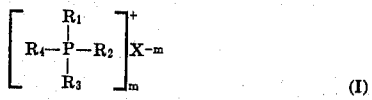

(I)

wherein $R_1$, $R_2$ and $R_3$ are independently selected from the group consisting of hydrogen, aliphatic hydrocarbon radicals containing from about one to about 20 carbon atoms, and radicals represented by the formula $-R_5-Y$ wherein $R_5$ is an aliphatic hydrocarbon radical having from about one to about 20 carbon atoms, and Y is a member selected from the group consisting of Cl, Br, I, $NO_2$, H and OH, $R_4$ is selected from the same group as $R_1$, $R_2$ and $R_3$ and aromatic hydrocarbon radicals and alkyl substituted aromatic hydrocarbon radicals and wherein X is the anion portion of an acid, ester or acid ester of an element selected from carbon, nitrogen, phosphorus, sulfur, silicon and boron and wherein m is the valence of the anion X.

One group of catalysts employed in this invention are the phosphonium salts of an acid of the element nitrogen which are represented by the general formula

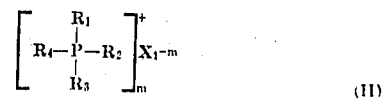

(II)

wherein $R_1$, $R_2$, $R_3$ and $R_4$ are as defined in Formula I, m is the valence of the anion $X_1$ and has a value of 1 and wherein $X_1$ is selected from the group consisting of

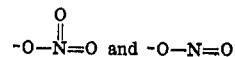

Suitable such phosphonium salts of a nitrogen-containing acid catalyst include, for example, tetrabutyl phosphonium nitrate, tetramethyl phosphonium nitrite and the like.

Another group of catalysts employed in the present invention are the phosphonium salts of an acid, ester, or acid ester of the element phosphorus which are represented by the general formula

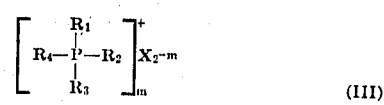

(III)

wherein $R_1$, $R_2$, $R_3$ and $R_4$ are as defined in Formula I above wherein m is the valence of the anion $X_2$ and has a value from 1 to 3, and wherein $X_2$ may be represented by the general formulas

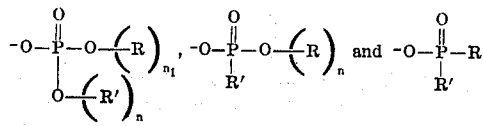

wherein each R and R' are independently selected from the same group as $R_1$, $R_2$, $R_3$ and $R_4$ above and wherein n and $n_1$ independently have values equal to 0 or 1.

Suitable such phosphonium salts of a phosphorus containing acid, ester or acid ester catalyst include, for example, tetrabutyl phosphonium diethylphosphate, di(tetrabutylphosphonium)ethylphosphate, tri(tetramethylphosphonium) phosphate, tetramethylphosphonium dimethyl phosphate, methyltrioctylphosphonium dimethylphosphate, methyltributylphosphonium dimethyl phosphonate, ethyltributylphosphonium diphenylphosphinate and the like.

Another group of catalysts employed in the present invention are the phosphonium salts of an acid, ester or acid ester of the element sulfur which are represented by the formula

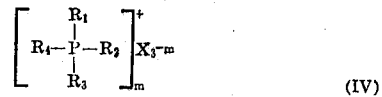

(IV)

wherein $R_1$, $R_2$, $R_3$ and $R_4$ are as defined in Formula I, wherein m is the valence of the anion $X_3$ and has a value from 1 to 2, and wherein $X_3$ is selected from the group represented by the general formulas

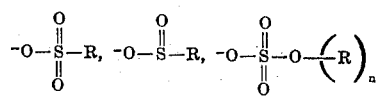

wherein R is independently selected from the same group as $R_1$, $R_2$, $R_3$ and $R_4$ as defined in Formula I and wherein n has a value of zero or 1.

Suitable such phosphonium salts of a sulfur-containing acid, ester or acid ester catalysts include, for example, tetramethylphosphonium ethylsulfate, di(tetrabutylphosphonium) sulfate and the like.

Another group of catalysts employed in the present invention are the phosphonium salts of an acid, ester or acid ester of the element silicon which are represented by the general formula

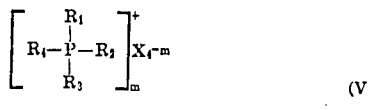 (V)

wherein $R_1$, $R_2$, $R_3$ and $R_4$ are as defined in Formula I, wherein $m$ is the valence of the anion $X_4$ and has a value of from 1–4, and wherein $X_4$ is represented by the general formula

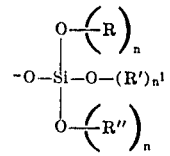

wherein R, R' and R'' are independently selected from the same group as $R_1$, $R_2$, $R_3$ and $R_4$ defined as in Formula I and wherein n, $n_1$ and $n_2$, independently, have values of zero or 1.

Suitable such phosphonium salts of a silicon containing acid, ester or acid ester catalyst include, for example, tetramethylphosphonium triethylsilicate, di(tetrabutylphosphonium)diethylsilicate, tri(tetramethylphosphonium)ethylsilicate, tetra(tetrabutylphosphonium) silicate and the like.

Another group of catalysts employed in the present invention are the phosphonium salts of an acid, ester or acid ester of the element boron which are represented by the general formula

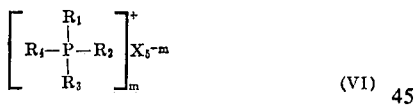 (VI)

wherein $R_1$, $R_2$, $R_3$ and $R_4$ are as defined in Formula I, wherein $m$ is the valence of the anion $X_5$ and has a value of from 1 to 3, and wherein $X_5$ is represented by the general formula

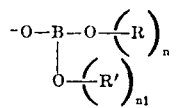

wherein R and R' are independently selected from the same group as $R_1$, $R_2$, $R_3$ and $R_4$ defined in Formula I and wherein $n$ and $n_1$ independently have values of 0 or 1.

Suitable such phosphonium salts of a boron-containing acid, ester or acid ester catalyst include, for example, tetrabutylphosphonium diethylborate, tetramethylphosphonium dimethylborate, di(tetramethylphosphonium) ethylborate, tri(tetrabutylphosphonium)borate, tetramethylphosphonium dipropylborate and the like.

Another group of catalysts employed in the present invention are the phosphonium salts of an acid, ester or acid ester of the element carbon which are represented by the formula

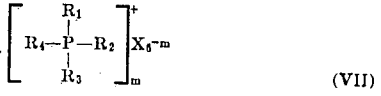 (VII)

wherein $R_1$, $R_2$, $R_3$ and $R_4$ are as defined in Formula I, m is the valence of the anion $X_6$ and has a value of 1–2, and $X_6$ is represented by the formulas

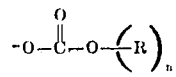

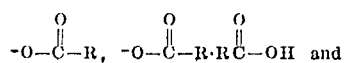 and

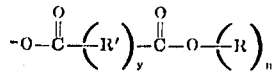

wherein R and R' are independently selected from the same group as $R_1$, $R_2$, $R_3$ and $R_4$ as defined in Formula I and R can also be an alkenyl group having from about one to about 20 carbon atoms, and R' can also be an alkenylene group having from about one to about 20 carbon atoms and $n$ has a value equal to 0 or 1 and wherein $y$ has a value of 0 or 1.

Suitable such phosphonium salts of carbon-containing acid, ester or acid ester catalysts include, for example, tetramethylphosphonium acetate, di(tetrabutylphosphonium) carbonate, triethylphenylphosphonium ethyl-carbonate, tributylphenylphosphonium ethyloxalate, di(tetramethylphosphonium) oxalate and the like.

In some instances, the phosphonium salts of a carboxylic acid employed as catalysts herein may contain some acid-salt complex without significantly adversely affecting the catalytic activity of the catalyst. In these instances, the catalyst complex may be represented by the general formula

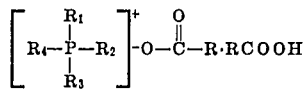

wherein R, $R_1$, $R_2$, $R_3$ and $R_4$ are as defined in Formula I.

The phosphonium catalysts employed in the present invention are commercially available compounds and general procedures and references for their preparation are given in Organo Phosphorus Compounds, by G. M. Kosolapoff, John Wiley & Sons, 1958.

Another class of catalysts which may be employed in the process of the present invention are the internal phosphonium salts (phosphobetaines) represented by the general formula

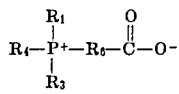

or when $R_6$ has about three carbon atoms by the formula

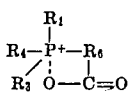

wherein $R_1$, $R_3$ and $R_4$ are as previously defined, and $R_6$ is an alkylene group having from about two to about 20 carbon atoms.

The internal phosphonium salts known as phosphobetaines may be prepared by the procedure outlined in the Journal of Organic Chemistry, Volume 27, pages 3,403–3,408, published in 1962.

Suitable such phosphobetaines include, for example, trimethylpropiophosphobetaine, tributylbutyrophosphobetaine, and the like.

Compounds having more than one phenyl or aromatic group in the cation portion of the phosphonium or ammonium compounds are not effective as a catalyst for promoting the cyanuric acid-epoxide reaction to form the oxazolidinone structure.

The catalyst is employed in catalytic quantities in the range of from about 200 to about 5,000 ppm and preferably from about 500 to about 1,500 ppm based upon the weight of the epoxy resin component.

The oxazolidinone-modified epoxy resins of the present invention can be employed in coatings, castings, adhesives, laminates, moldings, and the like. They may be employed either alone or in admixture with other epoxy resin compositions and cured by conventional epoxy curing mechanisms, i.e. by employing such curing catalysts as tertiary amines, Lewis acids and the like or such cross-linking agents as primary and secondary amine-containing compounds, polycarboxylic acid anhydrides, dicyandiamide and accelerated dicyandiamide, mercaptans, boron esters, siliconates and the like.

The oxazolidinone-modified epoxy resins of the present invention may be admixed with certain inert materials such as pigments, fillers, extenders, flexibilizers, mold release agents, viscosity and thixotropy controllers and the like as well as with reactive modifiers such as accelerators, reactive diluents and the like.

The resins of the present invention are also useful in such applications as castings, adhesives, potting compositions and the like.

The following examples are illustrative of the present invention, but are not to be construed as limiting the scope thereof in any manner.

EXAMPLE 1

Reaction of Diglycidylether of Bisphenol A with Cyanuric Acid at a Mole Ratio of 4.5:1.

To a reaction vessel equipped with a means for stirring, temperature control and application of a vacuum was added 100 grams (0.529 equiv., 0.264 mols) of the diglycidyl ether of bisphenol A (p,p'-isopropylidine diphenol) and 7.6 grams (0.1765 equiv., 0.0588 mols) of pulverized cyanuric acid. The temperature was raised to 160° C. and after maintaining that temperature for 1 hour under vacuum, no reaction had occurred. The cyanuric acid remained insoluble in the resin. To the above mixture was then added 100 mg. of tetrabutylphosphonium bromide and the reaction continued under vacuum at 160° C. for 1 hour. A homogeneous high viscosity solution resulted which solidified upon cooling to room temperature. The clear yellow solid product had a percent epoxide of 5.25 and a Durran's softening point of 120° C. Infrared analysis of the product gave a large, clean peak at 1,760 hz which indicated the oxazolidinone structure. Also, the quantity of hydroxyl groups in the product was greater than in the starting resin.

EXAMPLE 2

Reaction of Diglycidylether of Bisphenol-A with Cyanuric Acid at a Mol Ratio of 9.7:1.

To a reaction vessel equipped as in Example 1 were charged 100 grams (0.287 mols) of the diglycidylether of Bisphenol A having an epoxide equivalent weight (EEW) of 174, 3.8 grams (0.0295 mols) of cyanuric acid, and 100 mg of tetrabutylphosphonium bromide. The reaction was conducted at 132° C. for 7 hours, with samples being taken after 1,2,4 and 6 hours and analyzed for completeness of reaction. After the 6 hour analysis, a vacuum was applied and the reaction continued for 1 hour. The resultant product was a clear light yellow solid resin at room temperature which had a Durran's softening point of 55° C. and a percent epoxide of 16.75. The analyses of the intermediate samples were as follows:

| Reaction Time Hrs. | Oxazolidinone Content as % % Epoxide of Theoretical | Isocyanurate as % of Original |
|---|---|---|
| 1 | 20.6 5% | 95 |
| 2 | 19.9 growing | diminishing |
| 4 | 18.7 70% | 30 |
| 6 | 16.75 95% | 5 |

Thirty grams of the above prepared product was mixed with 5.8 grams of methylene dianiline and cured at 125° C. for 2 hours followed by curing at 175° C. for 2 hours. The cured ½ × ½ × 6 inch casting had a heat distortion temperature of 309° F. and a notched Izod impact strength of 0.64 ft-lb/inch.

EXAMPLE 3

Reaction of Diglycidyl Ether of Bisphenol A with Cyanuric Acid at a Mole Ratio of 5.3:1.

A reactor equipped as in Example 1 was charged with 100 grams (0.287 mols) of the diglycidyl ether of bisphenol A having an EEW of 174, 7.0 grams (0.0543 mols) of cyanuric acid and 100 mg. of tetrabutylphosphonium bromide. The reaction was conducted under a nitrogen atmosphere at atmospheric pressure for 3 hours. After applying a vacuum to remove dissolved gases, the product was cooled resulting in a clear, yellow solid resin having a percent epoxide of 9.1 and a Durran's softening point of 84° C.

Thirty grams of the above prepared product was mixed with 3.17 grams of methylene dianiline and cured into ½ × ½ × 6 inch bars at 125° C. for 2 hours plus 175° C. for 2 hours. The castings had a heat distortion of 273° F. and a notched Izod impact strength of 0.94 ft-lb/in.

EXAMPLE 4:

Reaction of Diglycidyl Ether of Bisphenol A with Cyanuric Acid at a Mole Ratio of 5.34 to 1.

To a reaction vessel equipped as in Example 1 was charged 25 lbs (0.0662 lb. mols) of the diglycidyl ether of bisphenol A having an EEW of 189, 1.60 lbs. (0.0124 lb. mols) of pulverized cyanuric acid and 11.3 grams of tetrabutylphosphonium bromide. After devolatilizing the contents at 100° C., the reaction was conducted at 170° C. for 3 hours. The contents of the reaction vessel were devolatilized and cooled to room temperature. The product was a solid which had a percent epoxide of 9.2 and a Durran's softening point of 86° C.

A molding powder formulation was prepared from the above prepared product employing the following recipe.

50 grams of the above prepared resin
5.27 grams of methylene dianiline
40.0 grams ASP 400 Clay
1.5 grams zinc stearate
1.0 gram resorcinol After pulverizing, mixing, screening through a 40 mesh sieve and compacting, the formulation was molded in a transfer molding press at 300° F. for 4 min. at 800 psi pressure. The molded composition had an initial heat distortion temperature of 208° F. which increased to 233° F. after postcuring at 180° C. for 2 hours, a flexural strength of 15,000 psi, and a notched Izod impact strength of 0.30 ft-lb/inch.

EXAMPLE 5:

Reaction of Diglycidyl Ether of Neopentylglycol with Cyanuric Acid at a Mole Ratio of 8.0 to 1.0.

To a reaction vessel equipped as in Example 1 were charged 100 grams of the diglycidyl ether of neopentyl glycol (0.366 mols, % epoxide = 31.5). After devolatilizing at 80° C., 4.89 grams (0.0379 mols) of cyanuric acid and 0.102 grams tetrabutylammonium bromide were added and after reacting the contents of the vessel at 155° C. under a nitrogen atmosphere for 3 hours, an additional 1.0 gram (0.00715 mols) of cyanuric acid was added and the reaction continued at 155° C. for an additional 4 hours. The resultant product was a clear, colorless liquid which had a percent epoxide of 18.45 and a viscosity at 26° C. of 550 centipoises.

A mixture comprising 100 parts by weight of the above prepared resin and 6.45 parts by weight of methylene dianiline were molded into one-eighth inch thick sheets at a temperature of 125° C. for 2 hours plus 175° C. for an additional 2 hours. Tensile test specimens were cut and tested resulting in an average tensile strength of 5,950 psi at 11 percent elongation. The test specimens exhibited cold drawing or necking down during the test which is unusual in a thermoset resin.

EXAMPLE 6:

Reaction of Epoxy Novolac Resin with Cyanuric Acid at a Mole Ratio of 6.9 to 1.

To a reaction vessel equipped as in Example 1 was added 151.05 grams (0.257 mols) of an epoxy novolac resin having a functionality of about 3.5 and an EEW of 168. After devolatilizing at 130° C., 4.81 grams of cyanuric acid and 0.15 grams of tetrabutyl phosphonium bromide was added. After the addition of the catalyst, an exotherm to 177° C. occurred. After the exotherm had subsided, the reaction was conducted at 165° C. for 7 hours. The resultant product was an opaque, reddish-yellow solid having a percent epoxide of 18.0 and a Durran's softening point of 68° C.

EXAMPLE 7

Reaction of Diglycidyl Ether of Hydrogenated Bisphenol A With Cyanuric Acid at a Mole Ratio of 6 to 1.

To a reaction vessel equipped as in Example 1 was charged 132.6 grams (0.3 moles) of hydrogenated bisphenol A having an EEW of 222 and 1.46 grams of tetramethyl ammonium hydroxide pentahydrate. After heating to 100° C., a slurry consisting of 6.45 grams (0.05 moles) of pulverized cyanuric acid and about 100 grams of dimethylformamide was slowly added over a 20-minute period. The temperature was raised to 135° C. for 2 hours. Infrared analysis revealed complete disappearance of the cyanuric acid and the presence of the oxazolidinone ring. The product was filtered and the solvent removed under vacuum at 100° C. The resultant product upon cooling was a clear light yellow solid which had a percent epoxide of 8.9.

COMPARATIVE EXAMPLE

Reaction of Diglycidyl Ether of Bisphenol A with Toluene Diisocyanate at a Mol Ratio of 2.31 to 1.

A reactor equipped as in Example 1 was charged with 150 grams (.421 mol) of the diglycidyl ether of bisphenol A having an EEW of 178 and 0.10 grams of triethylene diamine catalyst. The resin was heated to 165° C. under a nitrogen purge at atmospheric pressure. Toluene diisocyanate (a commercial mixture of an 80/20 ratio of the 2,4- and 2,6-isomers) was added in small charges, slowly increasing the reaction temperature to 182° C. After 2 hrs., a total of 31.66 grams (0.182 mol) of toluene diisocyanate had been added and the reaction mass was shown to be solid at room temperature. A drop of benzyldimethylamine was added and the temperature maintained at 182°–200° C. for an additional 2 hours until infrared analysis showed that no unreacted isocyanate remained and that the isocyanate added had been converted to oxazolidinone with some isocyanate trimer present as an impurity. The product was devolatilized and removed from the reactor as a clear, brownish yellow solid resin having a percent epoxide of 15.1 and a Durran's softening point of 83° C.

Seventy grams of the above prepared product was mixed with 12.3 grams of methylene dianiline and cured into ½ × ½ × 6 inch bars at 125° C. for 2 hours then at 175° C. for 2 hours. The castings had a heat distortion temperature of 301° F. and a notched Izod impact strength of 0.40 ft-lb/inch.

A comparison of the above data with that of Example 3 clearly demonstrates that oxazolidinone-modified epoxy resin prepared from cyanuric acid has a 135 percent increase in Izod impact strength with only a 9.3 percent decrease in its heat distortion temperature as compared to an oxazolidinone-modified epoxy resin prepared from a diisocyanate, both resins being modified to the relatively same softening point, i.e. 84° C. and 83° C., respectively (see table below).
ta Physical Property of

| Example No. | Izod Impact Strength ft.-lbs./in. | Heat Distortion Temp., °F |
|---|---|---|
| 3 | 0.94 | 273 |
| Comparative | 0.40 | 301 |

I claim:

1. An oxazolidinone-modified epoxy resin represented by the formula $$H_2C\underset{H}{\overset{O}{\diagdown}}C-Z-\left[-\underset{H}{\overset{H}{\underset{|}{C}}}-\underset{OH}{\overset{H}{\underset{|}{C}}}-\underset{H}{\overset{H}{\underset{|}{C}}}-N\underset{X=C-O}{\overset{\diagup H\diagdown}{\overset{C}{\diagdown H}}}H-C-Z-\right]_n C\underset{H}{\overset{O}{\diagdown}}CH_2$$

wherein Z is the divalent organic residue of a polyglycidyl ether of a polyhydric compound, X is oxygen or sulfur, and $n$ has a value from 1 to about 10.

2. The oxazolidinone modified epoxy resin of claim 1 wherein Z is the residue of a diglycidyl ether of an aromatic polyhydric compound and $n$ has a value of from 1 to 3.

3. The oxazolidinone-modified epoxy resin of claim 2 wherein Z is the residue of the diglycidyl ether of p,p'-isopropylidine diphenol.

4. The oxazolidinone-modified epoxy resin of claim 1 wherein Z is the residue of the diglycidyl ether of hydrogenated p,p'-isopropylidine diphenol.

5. The oxazolidinone-modified epoxy resin of claim 1 wherein Z is the residue of the diglycidyl ether of a polyoxyalkylene glycol.

6. The oxazolidinone-modified epoxy resin of claim 5 wherein Z is the diglycidyl ether of a polyoxypropylene glycol.

7. The oxazolidinone-modified epoxy resin of claim 6 wherein the polyoxypropylene glycol has a molecular weight of about 400.

8. The oxazolidinone-modified epoxy resin of claim 1 wherein Z is the residue of a polyglycidyl ether having more than 2 epoxy groups.

9. The oxazolidinone-modified epoxy resin of claim 8 wherein Z is the residue of the polyglycidyl ether of a novolac resin.

10. The oxazolidinone-modified epoxy resin of claim 9 wherein Z is the residue of the polyglycidyl ether of a novolac resin having a functionality of about 3.5.

11. The oxazolidinone modified epoxy resin of claim 1 wherein Z is the residue of the diglycidyl ether of neopentylglycol.

12. The oxazolidinone modified epoxy resin of claim 11 wherein n has a value of from about 4 to about 10.

13. A thermoset table composition comprising an oxazolidinone-modified polyglycidyl ether of a polyhydric compound of claim 1 and a catalytic amount of a catalyst or a curing amount of a curing agent therefor.

14. The thermoset table composition of claim 13 wherein the polyhydric compound is p,p'-isopropylidene diphenol and the curing agent is methylenedianiline.

15. The thermoset table composition of claim 14 wherein the polyhydric compound is neopentyl glycol and the curing agent is dicyandiamide.

16. The product resulting from curing the composition of claim 13.

17. The product resulting from curing the composition of Claim 14.

18. The product resulting from curing the composition of Claim 15.

* * * * *

UNITED STATES PATENT OFFICE
CERTIFICATE OF CORRECTION

PO-1050
(5/69)

Patent No. 3,676,397      Dated July 11, 1972

Inventor(s) James A. Clarke

It is certified that error appears in the above-identified patent and that said Letters Patent are hereby corrected as shown below:

Col. 9, between lines 65-74, the table should read as follows:

| Reaction Time Hrs. | % Epoxide | Oxazolidinone Content as % of Theoretical | Isocyanurate as % of Original |
|---|---|---|---|
| 1 | 20.6 | 5% | 95 |
| 2 | 19.9 | growing | diminishing |
| 4 | 18.7 | 70% | 30 |
| 6 | 16.75 | 95% | 5 |

Col. 11, delete last line.

Col. 12, between lines 1-4, the table should read as follows:

| Example No. | Physical Property of Izod Impact Strength ft.-lbs./in. | Heat Distortion Temp., °F. |
|---|---|---|
| 3 | 0.94 | 273 |
| Comparative | 0.40 | 301 |

Claims 13-15, line 1; change "thermoset table" to -- thermosettable --.

Signed and sealed this 23rd day of January 1973.

(SEAL)
Attest:

EDWARD M. FLETCHER, JR.
Attesting Officer

ROBERT GOTTSCHALK
Commissioner of Patents